United States Patent
Sherry

(10) Patent No.: US 8,151,548 B1
(45) Date of Patent: Apr. 10, 2012

(54) FOLIAGE SKIRT

(76) Inventor: Duane D. Sherry, O'Fallon, MO (US)

( * ) Notice: Subject to any disclaimer, the term of this patent is extended or adjusted under 35 U.S.C. 154(b) by 37 days.

(21) Appl. No.: 12/858,458

(22) Filed: Aug. 18, 2010

(51) Int. Cl.
A01D 46/22 (2006.01)
(52) U.S. Cl. ......................................... 56/329
(58) Field of Classification Search ............. 56/329; 47/32, 31; D8/1
See application file for complete search history.

(56) References Cited

U.S. PATENT DOCUMENTS

| | | | | |
|---|---|---|---|---|
| 816,186 | A * | 3/1906 | Roberts | 56/329 |
| 853,833 | A * | 5/1907 | Saum | 56/329 |
| 1,366,563 | A * | 1/1921 | Fleckner | 56/329 |
| 1,415,863 | A * | 5/1922 | Boelman | 56/329 |
| 1,447,957 | A * | 3/1923 | Blum | 56/329 |
| 1,453,810 | A * | 5/1923 | Sleen | 47/31 |
| 2,436,173 | A * | 2/1948 | Knapp | 56/329 |
| 2,509,569 | A * | 5/1950 | Langford | 56/329 |
| 2,519,678 | A * | 8/1950 | MacKenzie | 56/329 |
| 2,649,680 | A * | 8/1953 | Brown | 56/329 |
| 3,105,347 | A * | 10/1963 | Anderson et al. | 56/329 |
| 4,573,310 | A * | 3/1986 | Friedel | 56/329 |
| 4,602,664 | A | 7/1986 | Hullen | |
| 4,901,513 | A | 2/1990 | Kim et al. | |
| 5,189,871 | A | 3/1993 | Frederiksen et al. | |
| 5,417,462 | A | 5/1995 | Hensley | |
| 5,524,423 | A | 6/1996 | Haley | |
| 5,848,522 | A * | 12/1998 | Coviello, Jr. | 56/329 |
| 6,282,878 | B1 * | 9/2001 | Hill | 56/329 |
| 6,705,044 | B2 * | 3/2004 | Clancey | 47/32 |
| D580,718 | S | 11/2008 | Smith | |
| 7,594,754 | B2 * | 9/2009 | Costello | 383/4 |
| D622,560 | S * | 8/2010 | Kuhn et al. | D8/1 |
| 2004/0139713 | A1 | 7/2004 | Ng | |
| 2005/0120692 | A1 | 6/2005 | Kim | |
| 2006/0021311 | A1 | 2/2006 | Kim | |
| 2009/0025357 | A1 | 1/2009 | Parsa | |

* cited by examiner

Primary Examiner — Arpad Fabian-Kovacs
(74) Attorney, Agent, or Firm — Montgomery Patent & Design, LLC; Robert C. Montgomery; Joseph T. Yaksich

(57) ABSTRACT

A foliage skirt is a device which encircles a trunk of a tree for collecting foliage clippings during trimming and subsequently removed and emptied. The device comprises a circular or ovular format comprising two halves, each provided with a lightweight and flexible plastic frame that conforms around the foliage at ground level and to any adjacent obstructions in the vicinity. Each frame half is covered by a flexible and durable mesh platform. The two halves and conjoined at a first side by a flexible hinge and at an opposing second side by a detachable hinge, thereby allowing the halves to swing open when being placed around the foliage and secured in a closed position. Foliage is trimmed using trimming tools and when completed, the device along with the clippings, are slid away from the foliage and folded upwardly and closed to contain the clippings for transport and disposal to a suitable location or into a container.

5 Claims, 7 Drawing Sheets

FOLIAGE SKIRT

RELATED APPLICATIONS

The present invention was first described in a notarized Official Record of Invention on Jul. 28, 2009, that is on file at the offices of Montgomery Patent and Design, LLC, the entire disclosures of which are incorporated herein by reference.

FIELD OF THE INVENTION

The present invention relates generally to collecting devices for trimmings and lawn debris, and in particular, to a device for the collecting and removal of trimmings from woody perennials or other trees and shrubs.

BACKGROUND OF THE INVENTION

Many Americans spend countless hours maintaining and caring for their lawns, flower beds, gardens, trees, and bushes in the yards around their homes. As a matter of pride and personal expression, these people care for their yards by cultivating the soil, removing weeds, apply fertilizer and pesticides, watering, and the like. One (1) additional task many of us are forced to do is that of trimming bushes, shrubs and trees at least once a year. While electric and gasoline powered trimmers allow us to make quick work of the actual trimming process, the cleanup process afterwards occupies most of the time. Even after a thorough raking or a vacuuming with a yard vacuum, many clippings remain behind detracting from the overall appearance. In the case of a professional landscaper, this extra time and effort can translate into lost revenue.

The use of various types and designs of lawn nets, leaf bags, and other devices for collecting trimmings and other lawn debris have attempted to solve these problems. Examples of these solutions can be seen by reference in several U.S. Patents. For example, U.S. Pat. No. 4,602,664, issued in the name of Hullen, discloses a method and apparatus for collecting lawn debris including flat pieces of netting placed on the ground to catch leaves as they fall from nearby trees. U.S. Pat. No. 5,417,462, issued in the name of Hensley, discloses a lawn net for capturing and retaining lawn debris which may be positioned upon a lawn for collecting debris without harming the lawn. U.S. Pat. No. 5,524,423, issued in the name of Haley, discloses a composting and leaf collection kit for removing fallen leaves and other yard waste.

While these devices may accomplish their specific intended purpose, each suffers from one (1) or more disadvantage or deficiency with respect to design, function, or effectiveness. In particular, the previous solutions typically are cumbersome and difficult in regards to transporting the collected lawn debris or trimmings. Additionally, these solutions do not allow the user to position the collecting device next to and around a trunk or stem of the tree or shrub which is being trimmed, leaving large open areas of the lawn surface for debris to collect.

Accordingly, there is a need for a means by which clippings from trees, shrubs, and bushes can be caught and disposed of in a quick manner without the disadvantages as described above. The development of the present invention substantially departs from the conventional solutions and in doing so fulfills this need.

SUMMARY OF THE INVENTION

In view of the foregoing references, the inventor recognized the aforementioned inherent problems and lack in the art, as well as observed that there is a need for novel device for simply and effectively collecting trimmings and other debris from trees, shrubs, bushes, and hedges. Thus, the object of the present invention is to solve the aforementioned disadvantages and provide for this need.

Another object of the present invention is to provide a device which simplifies post-trimming cleanup and eliminates the need for raking or lawn blowing and vacuuming.

Yet another object of the present invention is to provide a device which allows the user to easily pick up the collected trimmings and debris and transport it to a disposal location.

Yet another object of the present invention is to provide a device which allows the user to encircle the tree, bush, or shrub to prevent trimmings and debris from collecting on the lawn surface at the base of the tree, bush, or shrub.

Yet still another object of the present invention is to provide a device which can be folded in half to securely hold the trimmings and debris for movement to the disposal location.

Yet still another object of the present invention is to provide a device which is simple and intuitive to use with little to no training.

Yet still another object of the present invention is to provide a device which is durable and economical to manufacture.

One (1) or more of these and other objects of the invention are achieved by providing a device including a mesh netting having adapted to receive trimmings and other debris and a semi-rigid frame affixed to the perimeter of the netting for applying a tension to the netting, thus maintaining the netting in a generally outstretched configuration. The device is positioned adjacent to a woody perennial having a trunk and branches and covering a ground surface.

In at least one (1) embodiment of the invention the device provides two semi-circular halves connected by a hinged connection. The device includes a pair of semi-circular mesh panels, a pair of semi-circular frames affixed to the mesh panels about an arcuate perimeter edge, and a pair of bisecting frames affixed to the mesh panel about opposing bisected edges. The two (2) halves open about a flexible joint member and the bisecting frames enclose around the base of the tree, bush, or shrub being trimmed and the two halves are connected by a detachable joint member.

In at least one (1) alternate embodiment the device provides a rectangular mesh panel, a first half frame portion, a second half frame portion, and a hinged connection.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 foliage skirt
- 20 first platform portion
- 22 first perimeter frame section
- 24 first bisecting frame section
- 26 first mesh panel
- 27 first mesh edge
- 28 groove
- 29 adhesive
- 30 gap
- 35 orifice
- 37 perforation
- 40 second platform portion
- 42 second perimeter frame section
- 44 second bisecting frame section
- 46 second mesh panel
- 47 second mesh edge
- 50 flexible joint assembly
- 60 detachable joint assembly
- 61 joint member
- 62 joint aperture
- 64 latching fixture
- 66 ball fastener
- 70 common fastener
- 72 fastener aperture
- 80 alternate rectangular embodiment
- 82 long side frame section
- 84 short side frame section
- 86 rectangular mesh portion
- 88 fold-line
- 100 tree
- 110 hedge

DETAILED DESCRIPTION OF THE PREFERRED EMBODIMENT

Figure 4A:
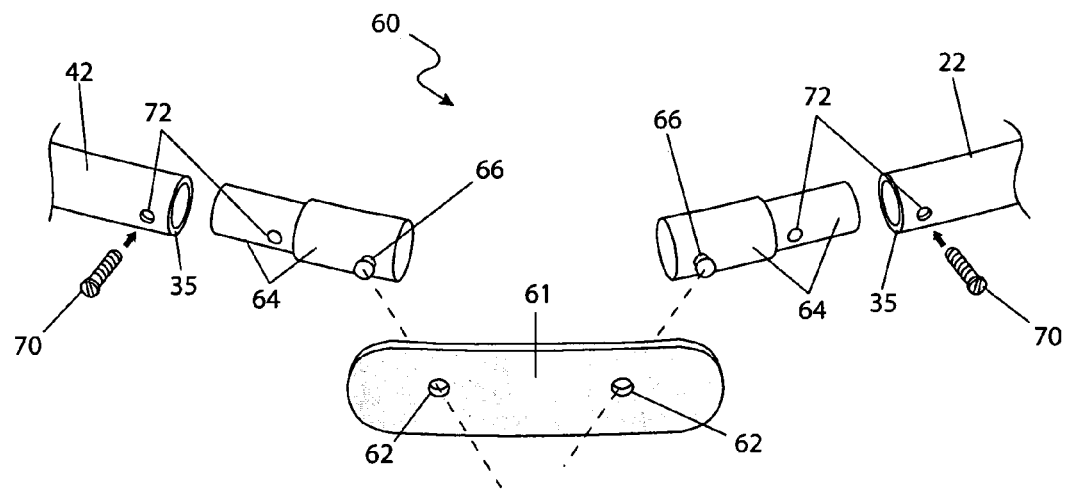
FIG. 4a is an exploded view of a detachable joint assembly 60 of the foliage skirt 10, according to a preferred embodiment of the present invention.
Figure 4B:
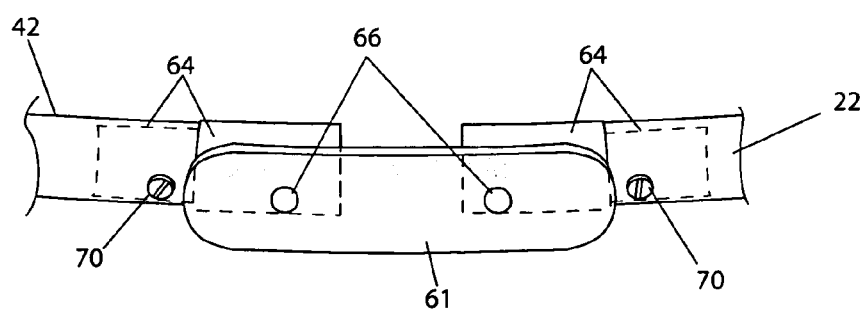
FIG. 4b is a close-up view of a detachable joint assembly 60 of the foliage skirt 10 depicting an attached state, according to a preferred embodiment of the present invention.
Figure 5:
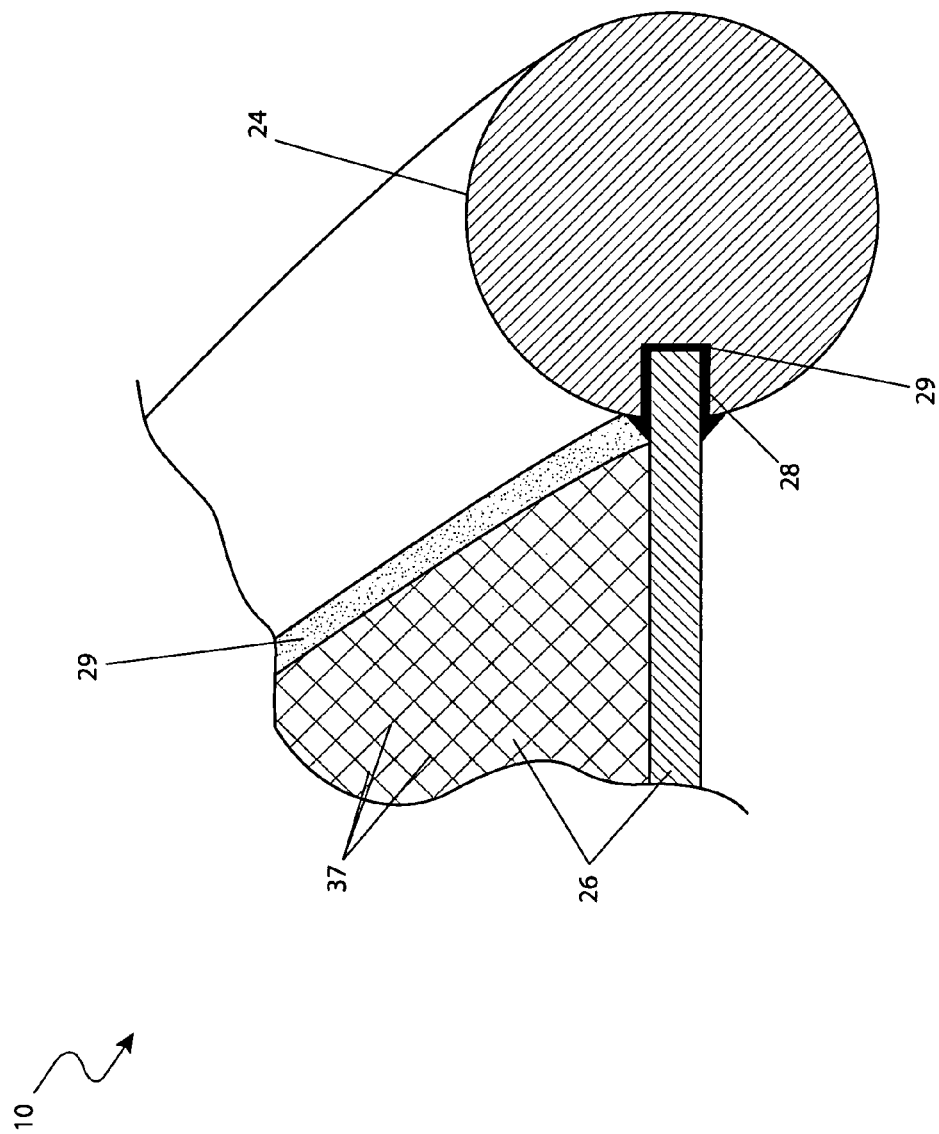
FIG. 5 is a section view of an attachment means between a first mesh portion 26 and a first bisecting frame member 24 of the foliage skirt 10 taken along section line A-A (see FIG. 3), according to a preferred embodiment of the present invention; and, FIG. 6 is a perspective view of an alternate rectangular embodiment 80 of the present invention.
Figure 6:
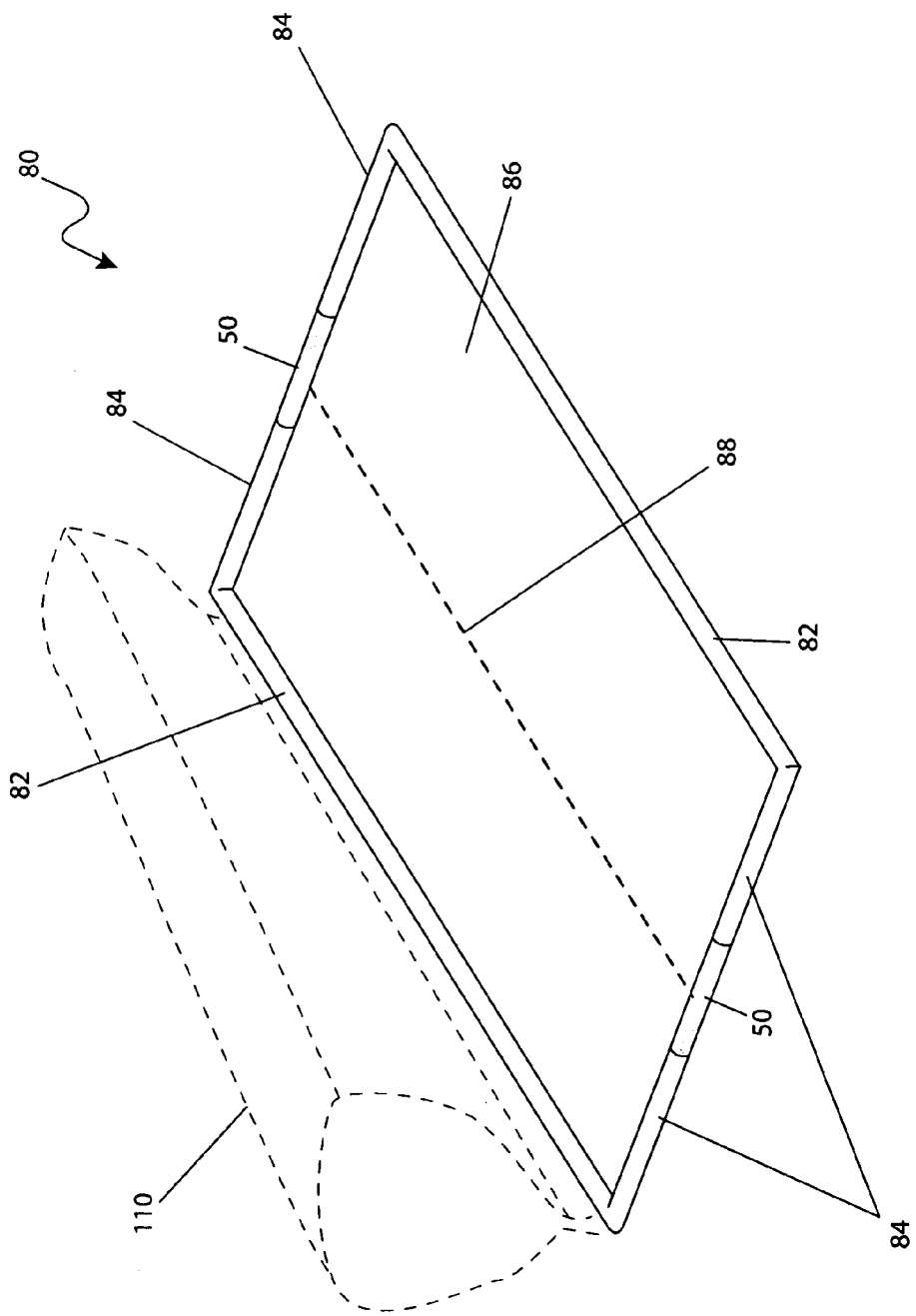

The best mode for carrying out the invention is presented in terms of its preferred embodiment, herein depicted within FIGS. 1 through 5 and in terms of an alternate embodiment, herein depicted in FIG. 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a foliage skirt (herein described as the "device") 10, which provides a device 10 that collects clippings from foliage such as bushes, shrubs, and trees during a trimming process. The device 10 generally comprises a circular or ovular-shaped platform being separated in half comprising a first platform portion 20 and a second platform portion 40.

Figure 1:
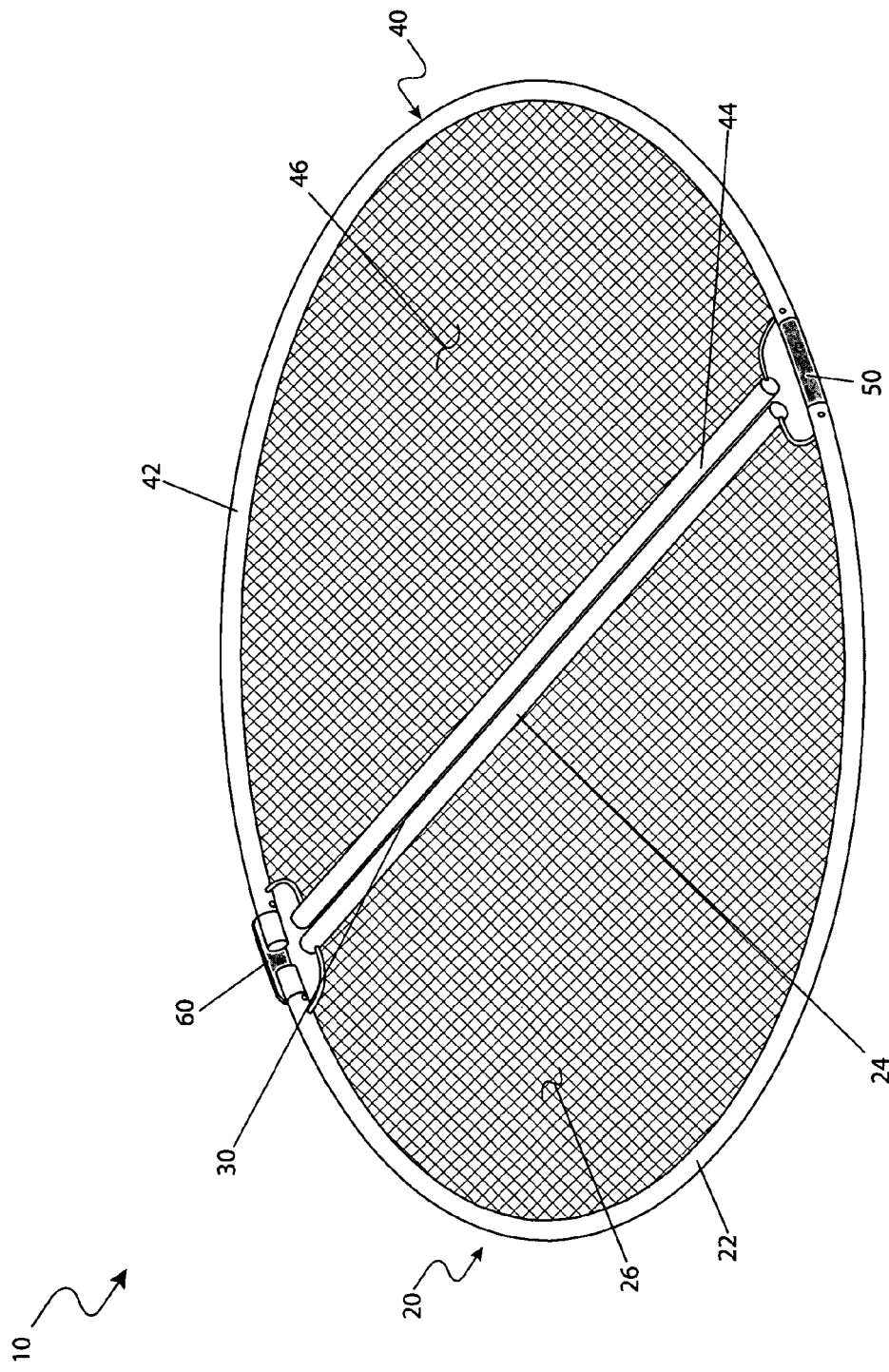
FIG. 1 is a perspective view of a foliage skirt 10, according to a preferred embodiment of the present invention.

Referring now to FIG. 1, a perspective view of the device 10, according to a preferred embodiment of the present invention, is disclosed. The first platform portion 20 further comprises a semi-rigid perimeter frame all around which further comprises a semi-circular first perimeter frame section 22 and a linear first bisecting frame section 24. The frame sections 22, 24 are envisioned to be made using a semi-rigid material such as plastic, fiberglass, aluminum, or the like, forming a solid or hollow structure preferably having a circular cross section of about one (1) inch in diameter and envisioned to be manufactured in an extrusion process. The bisecting frame member 24 is to be capable of bowing in an arcuate manner around a trunk portion of the tree 100 preceding a trimming task (see FIG. 2b). The frame sections 22, 24 encompass a flexible flat first mesh panel 26 having a first mesh edge 27 comprising a resilient reinforcing edge affixed to and spans a distance between the frame members 22, 24, thereby forming a framed platform structure. The first platform portion 20 provides an attachment means to the second platform portion 40 being affixed to via a permanently joined flexible joint assembly 50 and a detachable joint assembly 60 at opposing corner locations. The second platform portion 40 comprises a mirrored shape of the first platform portion 20 having like materials and construction and comprising respective elements including a second perimeter frame section 42, a second bisecting frame section 44, and a second mesh panel 46 having a second mesh edge 47. The joint members 50, 60 allow the device 10 to be split apart forming a pie-shaped gap 30 between the bisecting frame members 24, 44 as well as allowing the device 10 to be folded in half in a "clamshell-like" manner (see FIGS. 2a, 3, 4a, and 4b).

The frame sections 22, 24, 42, 44 and mesh panels 26, 46 are envisioned to be made using plastic extruded or molded processes and are further envisioned to be introduced in a variety of decorative colors and patterns based upon a user's preference.

Figure 2A:
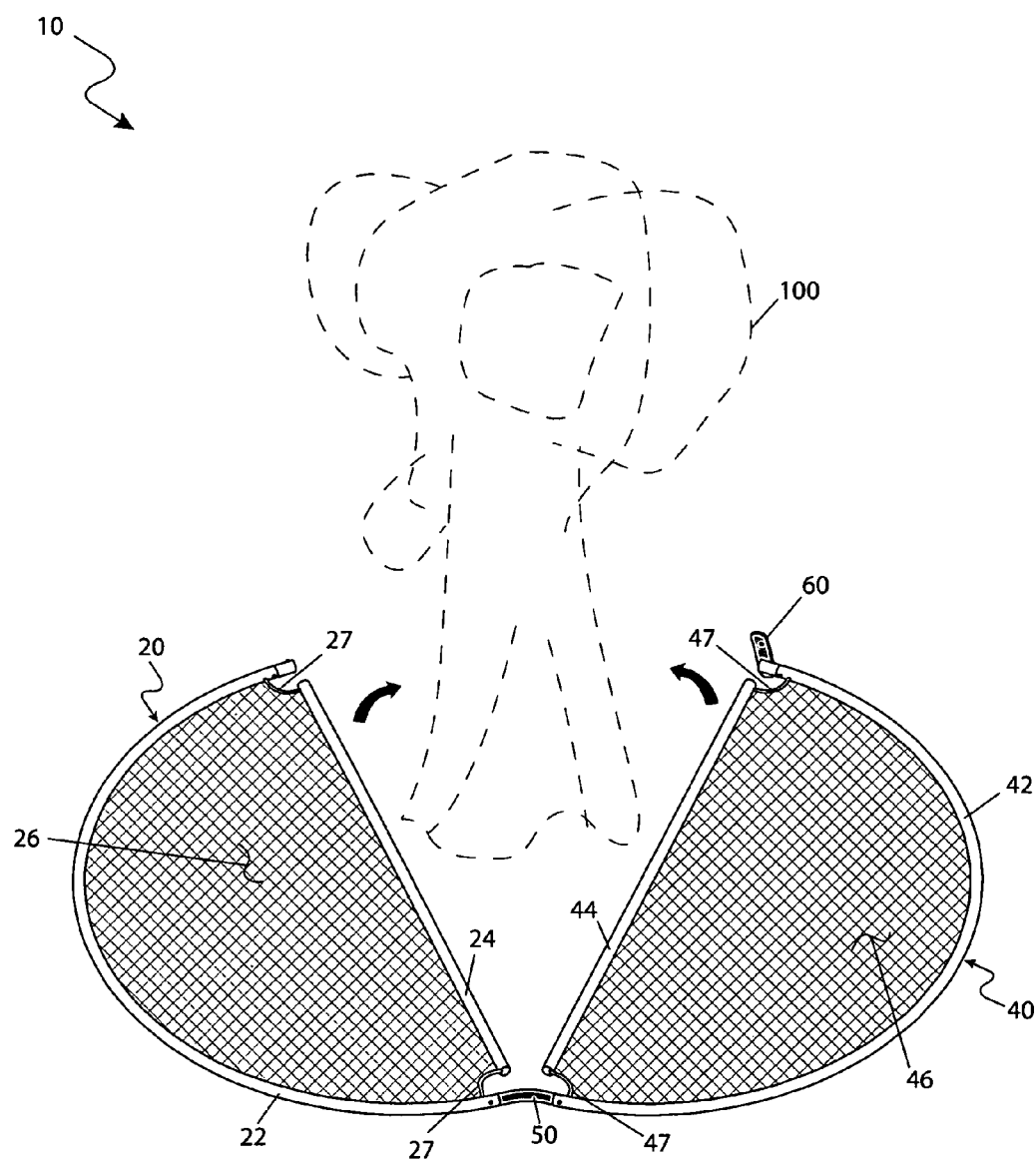
FIG. 2*a* is an environmental view of a foliage skirt 10 depicting a detached state around a tree 100, according to a preferred embodiment of the present invention.
Figure 2B:
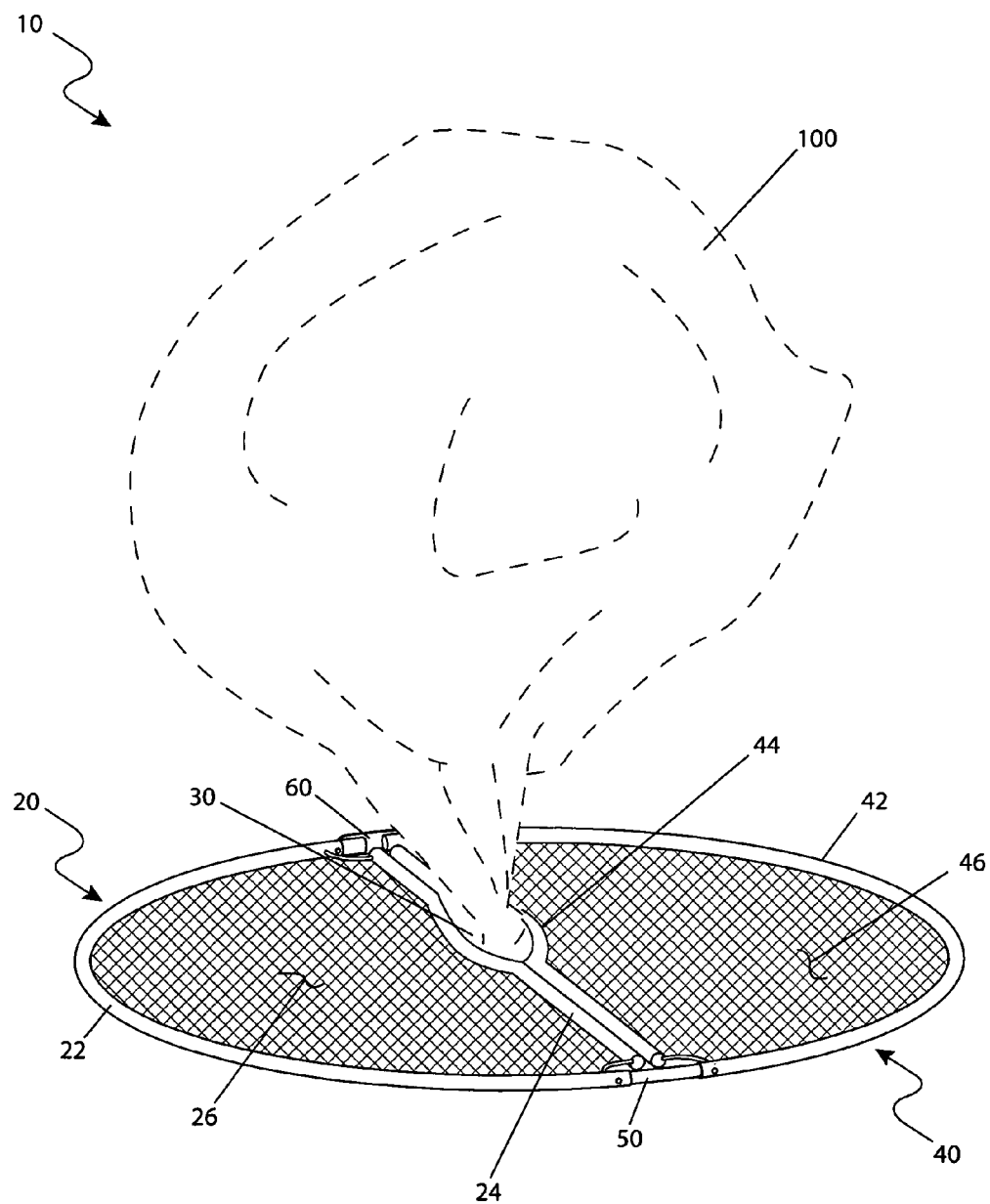
FIG. 2b is another environmental view of a foliage skirt 10 depicting an attached state around a tree 100, according to a preferred embodiment of the present invention.

Referring now to FIGS. 2a and 2b, environmental views of the device 10, depicting installation around a tree 100, according to the preferred embodiment of the present invention, are disclosed. The device 10 encircles a trunk section of a tree 100 during trimming, allowing easy removal and emptying of captured vegetation, thus saving time and effort during the clean-up process. The device 10 is provided in a circular or ovular format comprising two (2) conjoined semi-circular half portions 20, 40 capable of easy detachment via the detachable joint assembly 60, thereby allowing the device 10 to pivot open forming a gap 30 between the bisecting frame sections 24, 44 to be placed around the trunk portion of the tree 100. The detachable joint assembly 60 is then rejoined causing the bisecting frame sections 24, 44 to assume an arcuate shape around the trunk portion, thereby maximizing an amount of trimmed foliage to be captured by the device 10. Additionally, the joint members 50, 60 allow the device 10 to be folded upwardly in a "clamshell-like" manner to contain the clippings for transport and disposal thereof.

Figure 3:
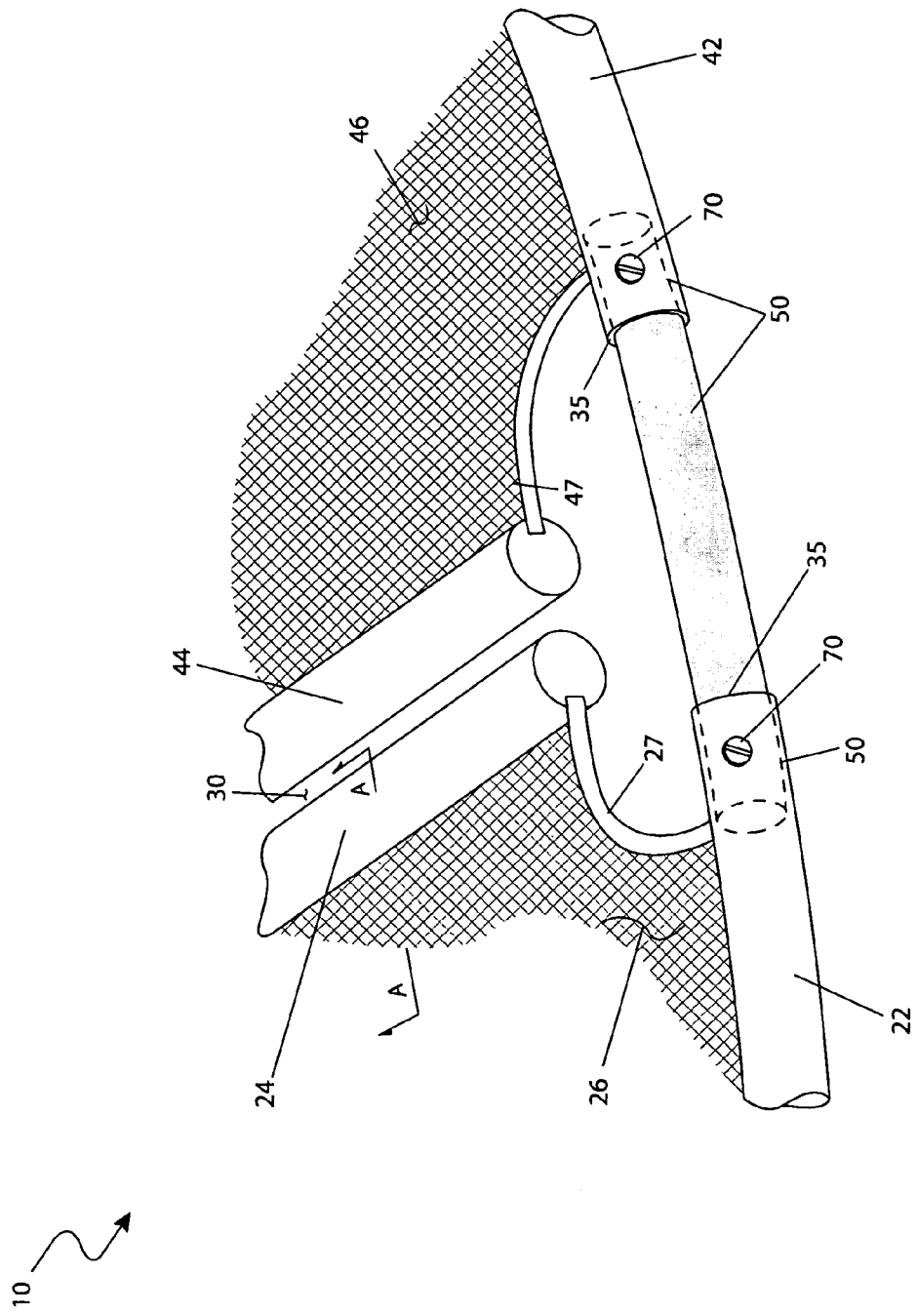
FIG. 3 is a close-up view of a flexible joint assembly 50 of the foliage skirt 10, according to a preferred embodiment of the present invention.

Referring now to FIG. 3, a close-up view of a flexible joint assembly portion 50 of the device 10, according to a preferred embodiment of the present invention, is disclosed. The flexible joint assembly 50 comprises a cylindrical length of flexible material envisioned to be rubber, latex, plastic, or the like, which allows orbital motioning of the platform portions 20, 40 with respect to each other. Each end portion of the flexible joint assembly 50 is inserted into a respective orifice 35 portion molded into an end portion of the first 22 and second 42 perimeter frame sections and is secured preferably using a common fastener 70 such as a rivet, screw, or the like, or may also be affixed using a common industrial adhesive with equal benefit.

It is further understood that the device 10 is not limited to the illustrated design of the flexible joint 50, and a person skilled in the art will appreciate that many other designs of the joint 50 are possible such as ball-and-socket type devices, combined single-axis hinging devices, and the like without deviating from the basic concept and as such should not be interpreted as a limiting factor of the device 10.

Referring now to FIGS. 4a and 4b, exploded and attached states of a detachable joint assembly 60 of the device 10, according to a preferred embodiment of the present invention, are disclosed. The detachable joint assembly 60 provides a flexible joining means between the first 22 and second 42 perimeter frame portions positionally opposite thereto, and in a similar manner, as the aforementioned flexible joint assembly 50; however, the detachable joint assembly 60 also provides removably attachable features which enable a user to easily detach the adjacent first 22 and second 42 frame portions from each other (see FIG. 2a). The detachable joint assembly 60 comprises a flexible rubber or plastic joint member 61 further comprising an elongated ovular or rectangular shape, envisioned to have a rectangular cross section. The joint member 61 further comprises a pair of joint apertures 62 formed through at opposing end portions. The detachable joint assembly 60 also comprises a pair of latching fixtures 64 each of which comprise a cylindrically-shaped molded plastic component being sized so as to provide sliding insertion and securement into adjacent orifice portions 35 of respective first 22 and second 42 perimeter frame sections in a similar manner as the previously described flexible joint assembly 50, also using common fasteners 70 and corresponding fastener apertures 72 (see FIG. 3). The latching fixtures 64 further comprise respective protruding ball fasteners 66 extending perpendicularly from respective side surfaces. The ball fasteners 66 provide an interference fit when inserted into respective joint aperture portions 62 of the joint member 61, thereby providing a removably detachable and flexible connection between the first 20 and second 40 platform portions. However, it is also understood that the design of the detachable joint assembly 60 is not limited to the illustrated design, and a person skilled in the art will appreciate that many other designs are possible without deviating from the basic concept and as such should not be interpreted as a limiting factor of the device 10.

Referring now to FIG. 5, a section view of an attachment means between a first mesh portion 26 and a first bisecting frame member 24 of the device 10 taken along section line A-A (see FIG. 3), according to a preferred embodiment of the present invention, is disclosed. The frame portions 22, 24, 42, 44 provide a rugged attachment to the respective mesh edges 27, 47 of the mesh panels 26, 46. A single joint is shown here between the first bisecting frame section 24 and the first mesh panel 26 for example sake. The second bisecting frame section 44 and second mesh panel 46 are affixed in an identical fashion. The joint between the first mesh panel 26 and the first bisecting frame section 24 is preferably formed using a rectangularly-shaped groove 28 molded into an outer surface of the first bisecting frame section 24 and being sized to slidingly receive the first mesh edge 27 thereinto. The first mesh edge 27 is securely held within the adhesive groove 28 using a common industrial adhesive 29; however, it is understood the device 10 is not limited to the illustrated attachment of the mesh panels 26, 46, and a person skilled in the art will appreciate that many other attachment methods are possible such as fasteners, molded locking features, and the like without deviating from the basic concept and as such should not be interpreted as a limiting factor of the device 10.

The first 26 and second 46 mesh panels are preferably made using a flexible plastic sheet material approximately one-eighth (1/8) to one-quarter (1/4) of an inch thick and containing a continuous pattern of equally-spaced geometric perforations 37 therethrough, being approximately one-eighth (1/8) of an inch in diameter, thereby providing a means for air or moisture to pass through during use.

Referring now to FIG. 6, a perspective view of an alternate rectangular embodiment 80 of the present invention, is disclosed. The alternate rectangular embodiment 80 of the present invention utilizes similar materials and construction methods as the preferred embodiment 10 described above; however, the alternate rectangular embodiment 80 is configured into a rectangular format, thereby being useful for applications such as, for example, along side portions of a row of common hedges 110, as seen here. The alternate embodiment 80 comprises a single rectangular mesh panel 86 a pair of opposing long side frame section 82 and two pairs of short side frame sections 84. A pair of short side frame sections 84 is perpendicularly affixed to opposing ends of each long side frame section 82. A pair of opposing flexible joint assemblies 50 connects the corresponding short frame section 84 on each end of the long side frame sections 82 to define a generally rectangular frame to which the rectangular mesh panel 86 attaches. The pair of flexible joint assemblies 50 attach to hollow end portions of the each short side frame sections 84 in a substantially similar manner as described for the preferred device embodiment 10 and allow the alternate embodiment 80 to be folded in half lengthwise along a central foldline 88 for containing, transporting, and disposing of contained foliage. It is further understood that other versions of the device 10 comprising additional perimeter shapes may be provided being useful for additional specific applications of the device 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 2a, 2b, and installed in terms of an alternate embodiment 80 as depicted in FIG. 6.

The method of installing and utilizing the preferred embodiment of the device 10 may be achieved by performing the following steps: detaching one (1) or both ball fastener portions 66 of the detachable joint assembly 60 from respective fastener apertures 72; opening the device 10 by pivoting the platform portions 20, 40 about the flexible joint assembly 50 forming a gap 30 between the bisecting frame sections 24, 44; placing the device 10 around a trunk or base portion of a foliage, such as a tree, shrub, or bush; closing the device 10 around the tree 100 or bush by motioning the platform portions 20, 40 together causing the bisecting frame sections 24, 44 to form an arcuate shaped gap 30 around the tree 100; joining the platform portions 20, 40 together by inserting one (1) or both ball fasteners 66 through respective joint apertures 62 of the detachable joint assembly 60 to secure the device 10 around the tree 100 to be trimmed; trimming the tree 100, bush, shrub, or the like, using conventional tools; allowing trimmed foliage to drop upon mesh panel portions 26, 46 of the device 10 until a trimming task is completed; separating the detachable joint assembly 60 using ball fastener 66 and joint aperture 62 portions; separating first 20 and second platform portions of the device 10 minimally so as to minimize spillage; dragging the device 10 and contained trimmings away from the trunk portion of the tree 100; reattaching the detachable joint assembly 60 as previously described; folding the device 10 upwardly in half in a "clamshell-like" manner, if desired; transporting and disposing of the trimmings contained within the folded device 10 at an appropriate location or container; and, benefiting from reduced time and effort spent during a clean task following tree 100 and bush 110 trimming afforded a user of the present device 10.

The method of installing and utilizing the alternate rectangular embodiment 80 of the device 10 may be achieved by performing the following steps: abutting a long side portion of the alternate rectangular embodiment 80 against a side portion of a row of hedges 110; trimming a side portion of the hedges 110 above the alternate rectangular embodiment 80 in a conventional manner, allowing trimmings to fall thereonto; folding the alternate rectangular embodiment 80 lengthwise in half by bending the flexible joint assemblys 50 in a "clamshell-like" manner to contain, transport, and dispose of the trimmings; and, repeat the procedure described above for the remaining side portion of the row of hedges 110.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A device for collection and removal of trimmings of foliage, said device comprising:
   a semi-circular first platform comprising:
      a first perimeter frame having a first end and a second end;
      a first bisecting frame having opposing ends rigidly affixed between said first perimeter frame first end and said first perimeter frame second end; and,
      a first mesh panel affixed between inner edges of said first perimeter frame and said first bisecting frame;
   a semi-circular second platform comprising:
      a second perimeter frame having a first end and a second end;
      a second bisecting frame having opposing ends rigidly affixed between said second perimeter frame first end and said second perimeter frame second end; and,
      a second mesh panel affixed between inner edges of said second perimeter frame and said second bisecting frame;
   a flexible joint affixed between said first perimeter frame first end and said second perimeter frame first end for providing multi-directional hinged connection of said first platform to said second platform; and,
   a detachable joint releaseably attachable to said first perimeter frame second end and said second perimeter frame second end;
   wherein said first platform and said second platform are separable about said flexible joint;
   wherein said first bisecting frame and said second bisecting frame can flexibly engage around a lower trunk of a tree or shrub adjacent to a ground surface when said first platform and said second platform are separated;
   wherein said detachable joint secures said first platform and said second platform in a closed position when engaged around said lower trunk such that said foliage is retained atop said first mesh panel and said second mesh panel; and,
   wherein said first platform and said second platform are foldable along an axis defined by said first bisecting frame and said second bisecting frame about said flexible joint and said detachable joint.

2. The device of claim 1, wherein said detachable joint further comprises a pair of latching fixtures insertably attached to said first perimeter frame second end and said second perimeter frame second end and a flexible joint member having a fastener aperture disposed on opposing ends releaseably attachable to said pair of latching fixtures.

3. The device of claim 2, wherein said flexible joint further comprises a resilient flexible member having opposing ends insertably attached to said first perimeter frame second end and said second perimeter frame second end.

4. The device of claim 3, wherein each of said latching features further comprises a perpendicularly protruding ball fastener for insertably attaching through said fastener apertures of said joint member.

5. The device of claim 4, wherein said first perimeter frame and said first bisecting frame each further comprises a first groove disposed along an interior center line for receiving a perimeter edge of said first mesh panel to be secured therewithin; and,
   wherein said second perimeter frame and said second bisecting frame each further comprises a second groove disposed along an interior center line for receiving a perimeter edge of said second mesh panel to be secured therewithin.

* * * * *